Feb. 2, 1965 — N. SHERWOOD — 3,167,982
TOOL FOR TAPERING TUBING ENDS
Filed July 18, 1962
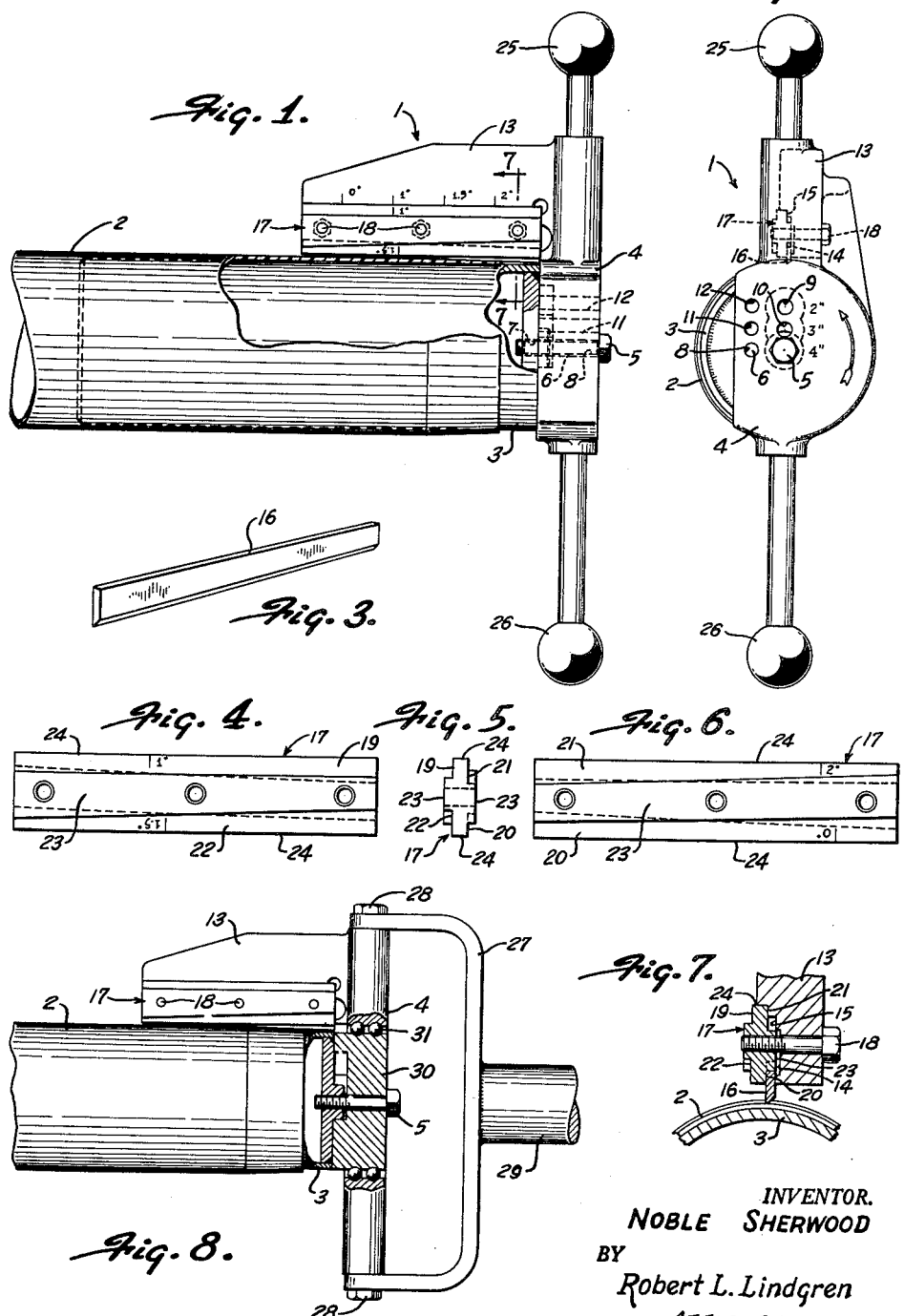
INVENTOR.
NOBLE SHERWOOD
BY Robert L. Lindgren
ATTORNEY 3,167,982
TOOL FOR TAPERING TUBING ENDS
Noble Sherwood, Shorewood, Wis., assignor to A. O. Smith Corporation, Milwaukee, Wis., a corporation of New York
Filed July 18, 1962, Ser. No. 210,788
4 Claims. (Cl. 82—4)

This invention relates to an apparatus and method for reducing the wall thickness of a hollow article. The apparatus and method of this invention are particularly adapted to taper the end surface of plastic tubular articles.

In the installation and repair of tubular plastic articles, it has been found to be advantageous to utilize bell and spigot ends in connecting the articles. This determination stemmed from findings resulting from an extensive research program which indicated that threaded or bonded-abutting end connections were substantially lacking in shear strength and were therefore unreliable. The use of moderately tapered complementing bell and spigot ends to which an adhesive could be applied and then cured to securely bond the ends together was found to be satisfactory. Sufficient shear strength was developed in the use of this technique, and it was felt that a high degree of reliability could be established. The bell and spigot connection method further provided a simple mode of connection which required a minimum of skill and equipment.

Plastic pipe and tube is generally manufactured by extrusion of a plastic material or by application of a plastic film or tape to a mandrel. In either the case of extrusion or application of a plastic film to a mandrel, reinforcing animal, vegetable and or mineral fibers or fabric may be combined with the plastic material to provide a pipe or tube having additional strength and durability. A wide variety of both thermoplastic and thermosetting plastic base materials is in common use in the plastic pipe and tube industry.

In either the extrusion method or the application of a plastic to a mandrel, several rather serious manufacturing and field installation problems are posed in providing pipe lengths with bell and spigot ends. Extruded tubing has to be provided with specially fabricated bell and spigot end fixtures which necessarily have to be bonded to the tube or attached in some other way. The provision of such fixtures results in a substantial cost increase as well as an increase in manufacturing time.

In the manufacture of plastic pipe by applying a plastic to a mandrel, the provision of bell and spigot ends requires the use of special mandrel end fixtures and special plastic application and machining techniques. These specialized handling procedures increase material cost and manufacturing time. In addition to the increased pipe cost to the consumer, the field installation of plastic pipe frequently requires the cutting down of the standard lengths supplied by the manufacturer. Therefore, assuming bell and spigot ends were initially provided at the ends of a standard pipe length by the pipe manufacturer, the cutting down of the length, where shorter than the standard length is required, will result in an end with neither a bell nor a spigot configuration. The connection of such an end to another pipe end or coupling entails the use of special fixtures. Due to the substantial expense of such adapting fixtures, their frequent use greatly increases the time required for installation as well as the cost of installation.

In the manufacture of fiber reinforced plastic pipe, a filament or tape composed of a number of filaments is applied to a mandrel in combination with a plastic material. The filament or tape is wrapped about the mandrel under some degree of tension. When the desired number of layers have been applied to the mandrel and the plastic material has been cured, the mandrel is withdrawn. The resulting tubular article has an inner diameter which conforms very closely to the outer diameter of the mandrel. The outer diameter of the tubular article tends to be generally irregular. The irregularity of this surface results from factors such as slight variations in wrapping tension, filament misalignment, variations in plastic concentration, and minor irregularities resulting from the curing phase.

Previously, a practice was followed in the manufacture of fiber reinforced plastic pipe of forming bell ends in the pipe during the wrapping phase and of subsequently machining an end of the tubular article to provide a complementing bondable spigot end. The practice included the insertion of an expandable-type mandrel into the interior of the pipe and expanding it into compressive contact with the inner surface thereof. A cutting tool utilizing the longitudinal axis of the mandrel as a gauge in establishing the angle and extent of cutting or shaping was used in combination with the expandable mandrel to machine a spigot end in the pipe. This end complemented and was insertable in a preformed and prepared bell end.

The use of this combination gave rise to a number of difficulties since the expandable mandrel tended to transmit unequal stresses to the pipe wall when expanded into compressive contact therewith. These stresses were believed to be caused primarily by the irregular outer surface of the pipe. When the cutting operation was completed and the expandable mandrel was removed from the pipe, the unequally distributed stress loads exerted upon the pipe wall were relieved. The machined or shaped portion of the pipe upon relaxation of the mandrel stresses assumed an irregular uneven surface. These irregularities appeared in the form of concave, convex or flat areas in the machined or shaped portion of the pipe. These irregularities provided an unsatisfactory glueline when inserted in a bell end and thereby a relatively poor surface for the high strength bonding of the spigot element of a pipe to a bell element.

To promote the formation of a spigot element capable of establishing a glueline of optimum uniformity and a high strength bond with the bell element of a pipe section, it has been found that the outer pipe surface should be machined or shaped in conformity with the inner periphery of the pipe and without the exertion of substantial compressive stresses on the inner pipe wall. The inner pipe surface was found to serve satisfactorily as the gauging surface in determining the angle and extent of shaping to be undertaken. This is in considerable contrast to the use of the longitudinal axis of the expandable mandrel as a gauging reference point when positioned in compressive contact with the inner diameter of the pipe. The latter gauging method results in formation of a conical or other desired shape in the stressed article which becomes distorted when the stress is relieved while the former method provides an outer shaped surface which conforms substantially to the shape of the machining tool.

It was found that consistently reliable high strength bonded pipe connections could be made when the outer spigot surface was machined to a smooth and relatively even texture. The inner bell surface was lightly machined or abraded so that both the bell and the spigot element afforded bonding surfaces with disrupted and reactable molecules. The machined or shaped spigot end could then be readily inserted into a complementing pre-formed and prepared bell end and thereby provide a continuous wall-to-wall contact of the elements. By application of a bonding agent to the contacting surfaces, a reliable high strength connection of the end elements of the pipe resulted when the end elements were joined along a glueline of optimum uniformity.

The uniformity of distribution of the bonding agent and the continuous substantially uninterrupted surface contact provided by machining the spigot element into conformity with the bell configuration of the pipe permits the consistent attainment of high strength connections. In the use of expandable mandrels, such high strength connections are not continuously obtainable since the surface dissimilarities caused by the compressive contact of the mandrel prevent the uniform distribution of bonding agent on the shaped surface and the continuous contact of the surfaces to be bonded.

Generally, in installing pipe of the fiber reinforced plastic variety, it has been found that a spigot taper in the range of about 1° to 5°, as determined by the longitudinal pipe axis, yields highly satisfactory results. Tapers to such small angles necessarily involve the reduction of wall thickness adjacent the outermost end of the pipe or tube to paper thinness. Since most plastics, whether or not reinforced, as they approach such thinness become very fragile, they tend to tear, shred or crack under the cutting strain if not supported when cut.

The instant invention utilizes a tool which may be manually or mechanically operated and when so operated will taper the periphery of a pipe length in conformity with the configuration of the inner surface of the pipe to provide a spigot configuration at the end of the length which will complement and be insertable in a performed bell end and will provide a uniform glueline of optimum thickness. An adhesive may be applied to one or both of the complementing tapered ends. The spigot may then be inserted into the bell to provide a continuous uninterrupted length of pipe.

The spigot forming tool comprises a pipe wall supporting cylinder having a diameter slightly smaller than the inner diameter of the pipe to be treated and a blade which is attached to the outer periphery of the cylinder. The blade is disposed at a predetermined cutting angle with respect to the longitudinal axis of the cylinder.

A pipe end may be tapered to a spigot configuration by inserting the wall supporting cylinder into the pipe and into frictional contact with the inner surface thereof until the blade contacts the edge of the pipe end. The tool is then mechanically or manually rotated, and the blade which cooperates with the inner surface of the support cylinder tapers the pipe surface without damaging or deforming the surface in the area of the taper.

The method and apparatus of the instant invention has greatly reduced the requirement of specialized fixtures in field installations where frequent cutting down of standard lengths is required. The invention further facilitates the replacement and repair of pipe where segments of a line must be removed.

Other objects and advantages of the invention will appear in the course of the following description.

The drawings illustrate the best mode presently contemplated of carrying out the invention.

In the drawings:

FIGURE 1 is a side elevation of the tool of the invention shown in operative relation with a pipe end;

FIG. 2 is an end view of the tool;

FIG. 3 is a perspective view of the cutting blade;

FIG. 4 is a side elevation of the blade clamp;

FIG. 5 is an end view of the blade clamp;

FIG. 6 is a side elevation of the blade clamp illustrating the side opposite that shown in FIG. 4;

FIG. 7 is a partial sectional view of the tool positioned in operational relation with a pipe, taken on line 7—7 of FIGURE 1; and, FIG. 8 is a side elevation with parts broken away of a mechanically rotated tool.

The drawings illustrate several embodiments of the invention. FIGURE 1 shows the spigot forming tool 1 of the invention positioned in surface tapering relation with a glass fiber reinforced plastic pipe 2.

The tool includes a pipe supporting cylinder 3 which is designed to be inserted into the end of pipe 2 and to thereby provide a non-compressive peripheral pipe wall support during operation of the tool. The outer diameter of the cylinder is just slightly smaller than the inner diameter of the pipe. The diameter differential will facilitate the insertion of the cylinder 3 into the pipe 2 and provide sufficient clearance for the relative rotation of the cylinder with respect to the pipe.

A head is attached to an end of the cylinder 3 by a bolt 5 which is threaded axially into the center of the cylinder end. To prevent the cylinder 3 from rotating in the event the bolt 5 should become loose, a locating pin 6 is inserted axially into aligned openings 7 and 8 of the cylinder and head respectively. A series of additional bolt receiving openings 9 and 10 and locating pin openings 11 and 12 are provided in the head to accommodate cylinders of varying diameters. In this manner one tool can be made for use with pipe in a variety of diameters.

To mount a cutting device in operational relation with cylinder 3, the head 4 is formed with a flange section 13 which extends at a right angle from the head and is located in parallel alignment with the longitudinal axis of the cylinder 3. As may best be seen in FIG. 7, flange section 13 defines a pair of recesses 14 and 15 which extend along the longitudinal axis of the flange section and which are adapted to receive and support a blade 16 and clamp 17.

The cutting blade 16, shown in a perspective view in FIG. 3, is secured to flange section 13 by drawing both the blade 16 and clamp 17 firmly against the flange section with bolts 18. This attachment is most clearly illustrated in FIG. 7.

As is shown in FIGS. 4, 5 and 6, clamp 17 is formed with longitudinally extending blade mounting and locating channels 19, 20, 21 and 22. When clamp 17 is secured to flange section 13, the channels define predetermined angles with respect to the longitudinal axis of pipe 2 and cylinder 3. By positioning the rectangular blade 16 in abutting contact with the surfaces defining a selected channel of clamp 17, a predetermined cutting angle is etsablished with respect to the longitudinal axis of cylinder 3.

The blade 16 and clamp 17 are shown in operational relation in FIG. 7. One of the channel defining shoulders 23 of clamp 17 is firmly secured within recess 15 by bolt 18. One of the longitudinal end surfaces 24 of clamp 17 is maintained in continuous abutting engagement with the upper surface of recess 15. The longitudinal surface of blade 16 opposite the cutting edge is positioned in continuous abutting contact with the angle defining surface of channel 20 and is drawn tightly against flange section 13 by the combined action of clamp 17 and bolt 18.

Blade angle selection is accomplished by matching one of the angle reference numerals appearing on clamp 17 with the corresponding reference numeral stamped on the flange section 13, in this instance either 0°, 1°, 1.5°, or 2°, although the tool can be easily adapted for use with an infinite number of angles by modification of the clamp or flange section angles. As is shown in FIGURE 1, when it is desired to establish a one degree angle in a pipe end, clamp 17 is positioned on flange section 13 in a manner such that the reference numeral 1° and guide notch is positioned directly beneath the reference numeral 1° and guide notch of the flange section 13. As may be best seen in FIG. 7, blade 16 may then be positioned in channel 20 which, when the numerals have been properly aligned, is located diagonally opposite the channel bearing the reference numeral 1°. When the surfaces of the blade have been properly aligned with the guide surfaces of channel 20, the clamp and blade are bolted securely to the flange section.

In operation the cylinder 3 is inserted into the end of the pipe to be treated as the tool is gradually rotated by manually turning handles 25 and 26. As the pipe comes into contact with the blade 16, it is gradually reduced in diameter until the desired taper, 1° as illustrated in FIGURE 1, is established in the pipe end. During the cutting process, cylinder 3 acts to firmly support the inner periphery of the pipe and to prevent fraying, tearing, splitting or deforming of the end as its diameter becomes substantially and progressively reduced.

FIG. 8 illustrates a modified form of the invention. The tool, in this instance, is rotated mechanically by yoke 27 which is bolted to the tool by bolts 28. The yoke is rotated by a shaft 29 which is connected to a suitable mechanical rotating device which is not shown.

In the embodiment shown in FIG. 8, a cylinder support plate 30 is journaled in the head 4 for relative rotation on bearings 31. Cylinder 3 is attached to support plate 30 in the same manner as is shown in FIGURES 1 and 2.

In operation the tool is mechanically rotated through shaft 29 and yoke 27. Head 4 and the blade carrying flange section 13 are rotatably driven through yoke 27 about cylinder support plate 30 and cylinder 3 attached thereto. The blade carrying portion of the tool is thereby rotated around the pipe supporting cylinder at a convenient speed.

In mechanical operation of the tool, the rotation of the blade carrying portion of the tool about the relatively stationary pipe supporting cylinder serves several useful purposes. Since the pipe requires firm support during the cutting operation, the supporting cylinder 3 is necessarily in frictional contact with a substantial portion of the inner periphery of the pipe. If the cylinder was rotated with the blade, the frictional surface contact would create a substantial drag and thereby require a greater power input to rotate the tool at the desired speed. In the manufacture of glass reinforced plastic pipe the abrasive character of the glass would also act to rather rapidly wear down the surface of the cylinder 3 to a point where only loose support of the inner pipe wall could be obtained. Therefore, by rotating the cutting blade around the stationary mandrel, power requirements of the system can be reduced to afford operating economy, and support cylinder life can be extended substantially.

Various modes of carrying out the invention are contemplated as being within the scope of the following claims particularly pointing out and distinctly claiming the subject matter which is regarded as the invention.

I claim:

1. A device for reducing the wall thickness of a tubular article adjacent an end thereof comprising a base member having a cross-section slightly smaller than the cross-section of the tubular article to be tapered and being adapted to be positioned in frictional non-compressive and generally continuous peripheral wall supporting relation with respect to the tubular article, a head connected to the base member, the head being provided with a flange projecting outwardly therefrom in the direction of the longitudinal axis of the base, an elongated blade clamping member removably secured to the flange and being provided with a plurality of longitudinally extending channels, each channel being disposed in a separate predetermined angular relationship with the longitudinal axis of the clamping member, means for aligning the clamping member on the flange in a predetermined angular relationship with respect to the longitudinal axis of the base, a cutting blade having a cutting surface and a surface closely conforming to the surface of a preselected channel to establish a predetermined cutting angular relationship with respect to the base member, and means for removably securing the cutting blade in the preselected channel and between the flange and the clamping member whereby a variety of wall thickness can be provided in tubular articles by positioning the clamping member on the flange in a manner to produce any of the predetermined angular relationships provided by the channels of the clamping member.

2. A machine for tapering the surface of a conduit comprising, a base member adapted to be positioned in frictional non-compressive and generally continuous peripheral wall supporting relation with respect to the conduit, a blade mounting member rotatably connected to the base member, the blade mounting member being provided with a plurality of spaced axial bores extending in a direction generally parallel to the longitudinal axis of the base member to permit the machine to readily accommodate a plurality of conduit diameters, connecting means for removably connecting the base member to the blade mounting member through at least one of the axial bores to permit the substitution of base members of various diameters, the blade mounting member being disposed for relative rotation with respect to the base member, a cutting blade secured to the mounting member and extending therefrom at an acute angle to the longitudinal axis of the base member complementing the angle of taper to be imparted in the conduit, and means for producing relative rotation between the base member and the cutting blade whereby the conduit may be tapered under substantially reduced power requirements.

3. A tool for tapering the surface of a conduit comprising, a base member having a longitudinal axis and being adapted to be positioned in frictional non-compressive and generally continuous peripheral wall supporting relation with respect to a conduit, a blade mounting member removably secured to the base member, the blade mounting member having a plurality of spaced axial bores disposed in generally parallel alignment with the longitudinal axis of the base member, means for connecting the base member to the blade mounting member through an axial bore, a cutting blade secured to the mounting member and extending therefrom at an angle to the longitudinal axis of the base member complementing the angle of taper to be imparted in the conduit, and means for rotating the cutting blade to taper the conduit.

4. The tool of claim 3 including means associated with the base member, the blade mounting member and the connecting means for preventing the relative rotation of the members.

References Cited in the file of this patent

UNITED STATES PATENTS

| 1,841,550 | Parker | Jan. 19, 1944 |
| 2,356,402 | Haynes | Aug. 22, 1944 |
| 2,595,541 | Riordan | May 6, 1952 |
| 2,807,297 | Lucas | Sept. 24, 1957 |
| 2,868,085 | Klein | Jan. 13, 1959 |

OTHER REFERENCES

| 889 | Great Britain | Jan. 12, 1911 |